(12) United States Patent
Tomoda (10) Patent No.: US 10,847,183 B2
(45) Date of Patent: Nov. 24, 2020

(54) MAGNETIC DISK DEVICE AND WRITE PROCESSING METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yusuke Tomoda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/546,190

(22) Filed: Aug. 20, 2019

(65) Prior Publication Data

US 2020/0279584 A1  Sep. 3, 2020

(30) Foreign Application Priority Data

Feb. 28, 2019  (JP) .................................. 2019-036487

(51) Int. Cl.
*G11B 5/54* (2006.01)
*G11B 21/08* (2006.01)
*G11B 5/012* (2006.01)

(52) U.S. Cl.
CPC ............ *G11B 21/083* (2013.01); *G11B 5/012* (2013.01)

(58) Field of Classification Search
CPC ................. G11B 5/187; G11B 5/3103; G11B 2005/0005; G11B 5/56; G11B 5/10; G11B 5/6005; G11B 2005/0024; G11B 2020/10898; G11B 5/315; G11B 5/1817; G11B 5/3133; G11B 5/54
USPC .............. 360/75, 128, 313, 13.33, 13.34, 59
See application file for complete search history.

(56) References Cited

U.S. PATENT DOCUMENTS

| 8,917,481 | B2 * | 12/2014 | Kusukawa | G11B 5/187 360/125.3 |
|---|---|---|---|---|
| 8,953,282 | B2 | 2/2015 | Shiroishi et al. | |
| 8,964,332 | B1 * | 2/2015 | Katada | G11B 5/56 360/125.3 |
| 8,976,479 | B2 * | 3/2015 | Cideciyan | G11B 5/00813 360/55 |
| 9,311,945 | B2 | 4/2016 | Takahashi et al. | |
| 9,349,389 | B2 | 5/2016 | Takagishi et al. | |
| 9,454,991 | B2 * | 9/2016 | Sutardja | G06F 3/0611 |
| 9,792,933 | B2 * | 10/2017 | Koizumi | G11B 5/1278 |

(Continued)

FOREIGN PATENT DOCUMENTS

JP  2018-147540 A  9/2018

*Primary Examiner* — Nabil Z Hindi
(74) *Attorney, Agent, or Firm* — Kim & Stewart LLP (57) ABSTRACT

A magnetic disk device includes a disk, a head comprising a main magnetic pole and a write shield, and configured to generate a magnetic field from the main magnetic pole to the write shield to write data onto the disk, an assist element configured to assist the writing by generating a magnetic field or heating a surface of the disk, and a controller configured to control the head to write the data according to either a first recording method using the assist element or a second recording method not using the assist element depending on a condition of the assist element.

18 Claims, 9 Drawing Sheets

(56) References Cited

U.S. PATENT DOCUMENTS

| | | |
|---|---|---|
| 10,186,284 B2 | 1/2019 | Narita et al. |
| 2013/0028058 A1* | 1/2013 | Yasui .................. G11B 5/1278 369/13.14 |
| 2018/0047422 A1* | 2/2018 | Granz .................. G11B 5/012 |

* cited by examiner

MAGNETIC DISK DEVICE AND WRITE PROCESSING METHOD

CROSS-REFERENCE TO RELATED APPLICATION(S)

This application is based upon and claims the benefit of priority from Japanese Patent Application No. 2019-036487, filed Feb. 28, 2019, the entire contents of which are incorporated herein by reference.

FIELD

Embodiments described herein relate generally to a magnetic disk device and a write processing method.

BACKGROUND

In order to achieve a high recording density and a high recording capacity of a magnetic disk device, various recording methods have been developed, e.g., high-frequency assisted recording, Shingled write Magnetic Recording (SMR), Shingled Write Recording (SWR), and Thermally Assisted Magnetic Recording (TAMR). The high-frequency assisted recording method is a technique in which a magnetic head having a recording magnetic pole or a main magnetic pole, which is excited by the application of a recording current to generate a recording magnetic field, and a high-frequency oscillator is used, and a high-frequency magnetic field generated by energizing the high-frequency oscillator is applied to the disk, thereby reducing the coercivity of a portion of a disk to which the high-frequency magnetic field is applied. The thermally assisted magnetic recording method is a technique in which a magnetic head having a light emitting element to irradiate the disk with emission light rays is used, and the emission light rays are emitted from a tip end of the light emitting element and locally heat the disk, thereby reducing the coercivity of the heated portion of the disk. The shingled write recording method is a technique to overwrite a subsequent track over a part of a specific track when writing data to a magnetic disk.

DETAILED DESCRIPTION

Embodiments provide a magnetic disk device and a write processing method capable of improving reliability.

In general, according to one embodiment, a magnetic disk device includes a disk, a head comprising a main magnetic pole and a write shield, and configured to generate a magnetic field from the main magnetic pole to the write shield to write data onto the disk, an assist element configured to assist the writing by generating a magnetic field or heating a surface of the disk, and a controller configured to control the head to write the data according to either a first recording method using the assist element or a second recording method not using the assist element depending on a condition of the assist element.

According to another embodiment, a method of writing data onto a magnetic disk drive that has a head including a main magnetic pole and a write shield and an assist element, includes writing, by the head, data onto the disk according to a first recording method using the assist element, wherein the assist element assists the writing by generating a magnetic field or heating a surface of the disk, monitoring a condition of the assist element, and once a predetermined condition is met, writing by the head the data according to a second recording method not using the assist element.

Hereinafter, embodiments will be described with reference to the drawings. The drawings are merely examples and do not limit the scope of the embodiments of the present disclosure.

First Embodiment

Figure 1:
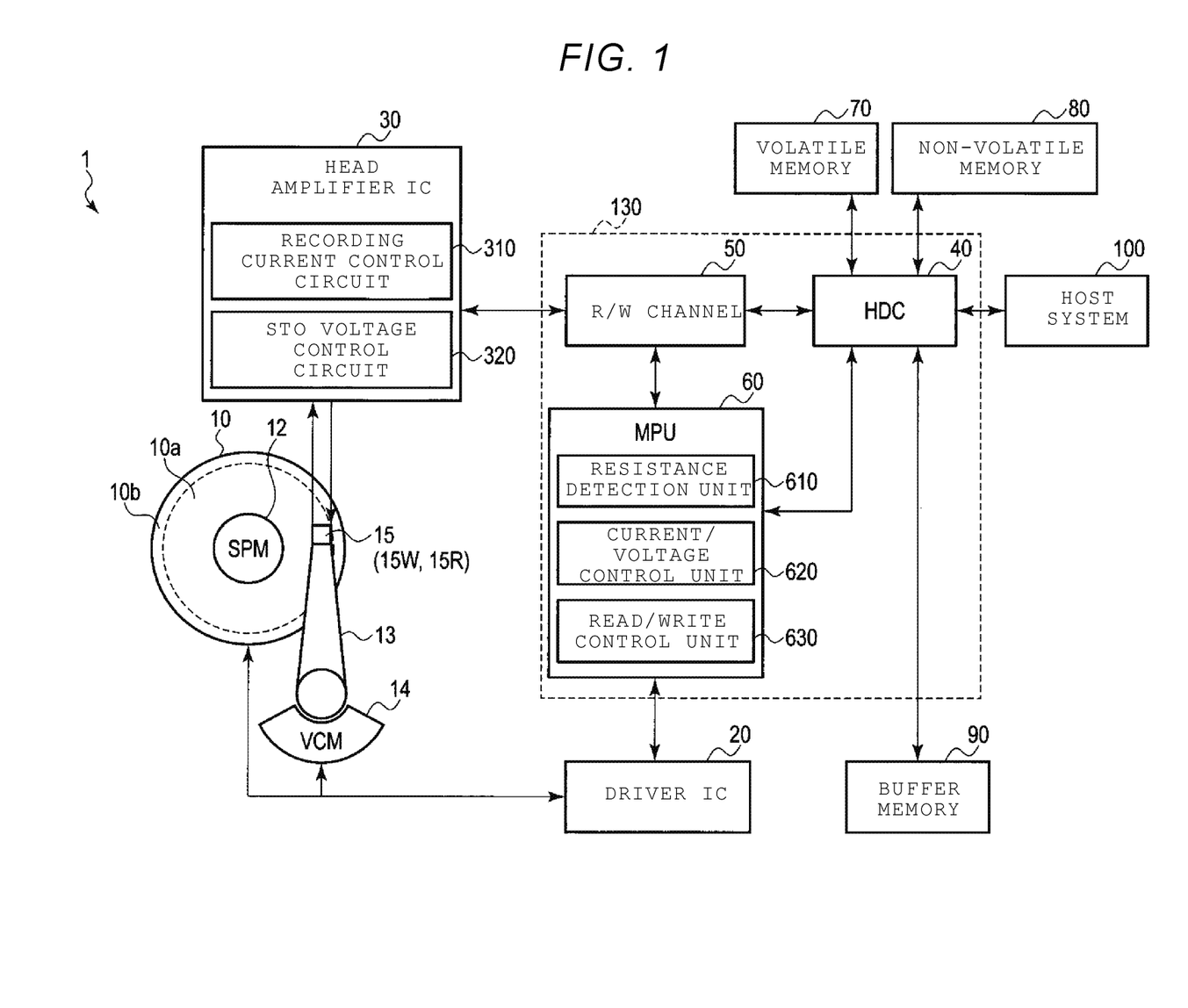
FIG. 1 is a block diagram illustrating a configuration of a magnetic disk device according to a first embodiment.

FIG. 1 is a block diagram illustrating a configuration of a magnetic disk device 1 according to the first embodiment. The magnetic disk device 1 includes a head disk assembly (HDA) described below, a driver IC 20, a head amplifier integrated circuit (hereinafter, head amplifier IC or preamplifier) 30, a volatile memory 70, a non-volatile memory 80, a buffer memory 90, and a system controller 130 which has one or more circuits integrated into one chip. The magnetic disk device 1 is connected to a host system (hereinafter, simply referred to as a host) 100.

The HDA has a magnetic disk (hereinafter, referred to as a disk) 10, a spindle motor (hereinafter, referred to as an SPM) 12, an arm 13 equipped with a head 15, and a voice coil motor (hereinafter, referred to as a VCM) 14. The disk 10 is attached to the SPM 12 and is rotated by the SPM 12. The arm 13 and the VCM 14 make up an actuator. The actuator controls the movement of the head 15 mounted on the arm 13 to a predetermined position of the disk 10 by driving the VCM 14. Two or more disks 10 and heads 15 may be provided.

In the disk 10, an area to which the data can be written is allocated with a user data area 10a available to a user and a system area 10b for writing information necessary for system management. Hereinafter, a direction perpendicular to a radial direction of the disk 10 is referred to as a circumferential direction. In the radial direction, a direction toward an outer periphery of the disk 10 is referred to as an outward direction and the opposite direction to the outward direction is referred to as an inward direction. In addition, a predetermined radial position of the disk 10 may be referred to as a radial position and a predetermined circumferential position of the disk 10 may be referred to as a circumferential position. The radial position corresponds to, for example, a track and the circumferential position corresponds to, for example, a sector. Further, the "track" is used to mean one of a plurality of radially divided areas of the disk 10, data extending in the circumferential direction of the disk 10, data written into the track, or various other meanings. The "sector" is used to mean one of a plurality of areas circumferentially dividing the track, data written to a predetermined position of the disk 10, data written to the sector, or various other meanings. The track written into the disk 10 may be referred to as a write track and the track read from the disk 10 may be referred to as a read track. The write track may be referred to simply as a track, the read track may be referred to simply as a track, and the write track and the read track may be collectively referred to as a track. The radial width of the write track may be referred to as a write track width and the radial width of the read track may be referred to as a read track width. The write track width and the read track width may be collectively referred to as a track width. The center position of the track width is referred to as a track center. A recording area having a predetermined width obtained by dividing the user data area 10*a* in the radial direction is referred to as a radial area. The radial area corresponds to, for example, a radial position, a track, a zone, or the like.

The head 15 has a slider as a main body and includes a write head 15W and a read head 15R mounted on the slider. The write head 15W writes data to the disk 10. The read head 15R reads the data recorded in the track on the disk 10. Further, the write head 15W may be referred to simply as the head 15, the read head 15R may be referred to simply as the head 15, and the write head 15W and the read head 15R may be collectively referred to as the head 15. The center of the head 15 may be referred to as the head 15, the center of the write head 15W may be referred to as the write head 15W, and the center of the read head 15R may be referred to as the read head 15R.

Figure 2:
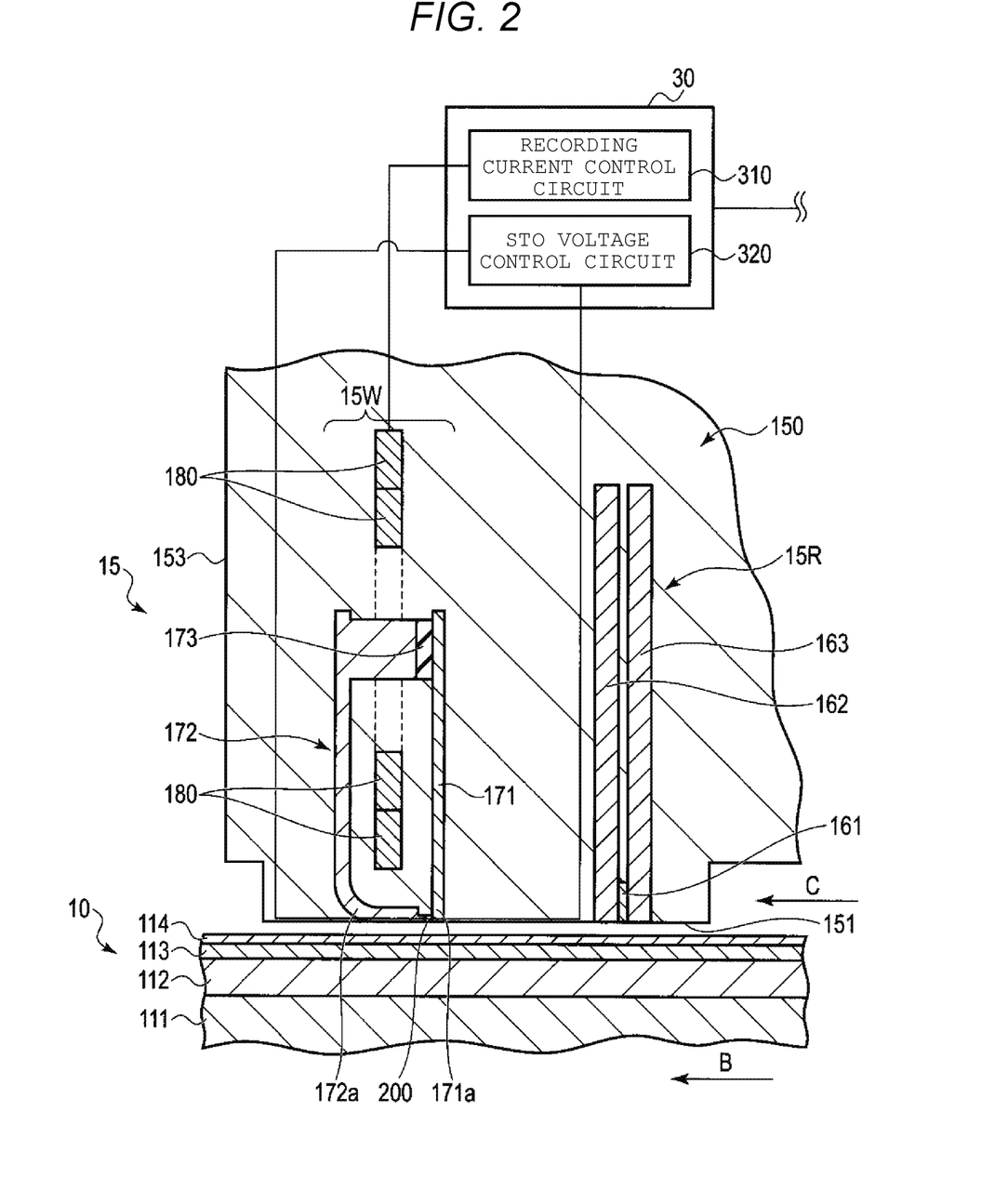
FIG. 2 is an enlarged cross-sectional view illustrating a disk and a head according to the first embodiment.

FIG. 2 is an enlarged cross-sectional view illustrating the disk 10 and the head 15 according to the first embodiment. In FIG. 2, a rotational direction B of the disk 10 and a direction of an airflow C coincide with each other. Hereinafter, a direction from the head 15 toward the disk 10 is referred to as a downward direction and a direction from the disk 10 toward the head 15 is referred to as an upward direction.

In the example illustrated in FIG. 2, in the disk 10, a substrate 111, a soft magnetic layer 112, a magnetic recording layer 113, and a protective film layer 114 are sequentially stacked. The substrate 111 is formed of a disk-shaped non-magnetic material. The soft magnetic layer 112 is formed of a material exhibiting soft magnetic properties above the substrate 111. The magnetic recording layer 113 is formed above the soft magnetic layer 112 and has magnetic anisotropy in a direction perpendicular to the surface (i.e., the surface of the magnetic recording layer 113 or the surface of the protective film layer 114) of the disk 10. The protective film layer 114 is formed on the magnetic recording layer 113.

In the example illustrated in the drawing, the head 15 includes a slider 150. The slider 150 is formed of, for example, a sintered body of alumina and titanium carbide (AlTiC). The slider 150 has a disk-facing surface (also referred to as an air bearing surface (ABS)) 151 which faces the surface of the disk 10 and a trailing end 153 which is located on the outflow side of the airflow C. Parts of the read head 15R and the write head 15W are exposed to the disk-facing surface 151.

The read head 15R includes a magnetic film 161, a shield film 162, and a shield film 163. The magnetic film 161 is located between the shield film 162 and the shield film 163 and produces a magnetoresistance effect. The shield film 162 is located on the trailing end 153 with respect to the magnetic film 161. The shield film 163 is opposed to the shield film 162. The lower ends of the magnetic film 161, the shield film 162, and the shield film 163 are exposed to the disk-facing surface 151.

The write head 15W is provided on the trailing end 153 of the slider 150 with respect to the read head 15R. The write head 15W includes a main magnetic pole 171, a trailing shield (also referred to as a write shield) 172, an insulator 173, a recording coil 180 disposed to be wound around a magnetic circuit including the main magnetic pole 171 and the write shield 172 to flow a magnetic flux to the main magnetic pole 171, and a spin torque oscillator (STO) 200, which works as an assist element for magnetic flux control.

The main magnetic pole 171 is made of a soft magnetic material having a high saturation magnetic flux density. The main magnetic pole 171 generates a recording magnetic field perpendicular to the surface of the disk 10 in order to magnetize the magnetic recording layer 113 of the disk 10. In the illustrated example, the main magnetic pole 171 extends substantially perpendicularly to the disk-facing surface 151. A lower surface of a tip end portion 171*a* of the main magnetic pole 171, which is the tip end portion on the disk-facing surface 151, is exposed to the disk-facing surface 151. The tip end portion 171*a* of the main magnetic pole 171 is tapered toward the disk-facing surface 151 and is formed in a narrow columnar shape with respect to the other portions. The width in a cross-track direction of the tip end portion 171*a* of the main magnetic pole 171 substantially corresponds to the track width of the write track. The cross-track direction is, for example, a direction along the radial direction.

The write shield 172 is made of a soft magnetic material having a high saturation magnetic flux density. The write shield 172 is provided to efficiently close the magnetic path through the soft magnetic layer 112 directly below the main magnetic pole 171. The write shield 172 is located on the trailing end 153 with respect to the main magnetic pole 171. The write shield 172 is connected to the main magnetic pole 171 via the insulator 173. The main magnetic pole 171 and the write shield 172 are electrically insulated and form a magnetic circuit. The write shield 172 is formed in a substantially L shape. In the write shield 172, a tip end portion 172*a* facing the tip end portion 171*a* of the main magnetic pole 171 with a write gap is provided on the disk-facing surface 151. The lower surface of the tip end portion 172*a* is exposed to the disk-facing surface 151 of the slider 150.

The recording coil 180 is provided to be wound around the magnetic circuit including the main magnetic pole 171 and the write shield 172 in order to flow the magnetic flux to the main magnetic pole 171. The recording coil 180 is provided, for example, between the main magnetic pole 171 and the write shield 172. The recording magnetic field in the main magnetic pole 171 and the write shield 172 is excited by supplying a current (referred to as a writing current or a recording current) of a predetermined magnitude to the recording coil 180. Therefore, the main magnetic pole 171 and the write shield 172 are magnetized. By changing a magnetization direction of a recording bit of the magnetic recording layer 113 of the disk 10 by the magnetic flux flowing through the magnetized main magnetic pole 171 and the write shield 172, a magnetization pattern according to the recording current is recorded on the disk 10.

The spin torque oscillator 200 is provided between the tip end portion 171a of the main magnetic pole 171 and the tip end portion 172a of the write shield 172. In other words, the spin torque oscillator 200 is provided in the write gap. The spin torque oscillator 200 has a structure in which, for example, a base layer formed of a nonmagnetic conductive layer, a spin injection layer, an intermediate layer, an oscillation layer, and a gap layer formed of a nonmagnetic conductive layer are sequentially stacked in order from the tip end portion 171a of the main magnetic pole 171 to the tip end portion 172a of the write shield 172. In the spin torque oscillator 200, by applying a predetermined voltage (hereinafter, referred to as a driving voltage) or a predetermined current (hereinafter, referred to as a driving current), the magnetization is uniformly rotated by the gap magnetic field generated in the write gap due to precession of the spin and a high-frequency magnetic field (i.e., microwave) having a sufficiently high-frequency in comparison with the frequency of the recording signal is generated toward the disk 10. The spin torque oscillator 200 reduces the coercivity of the magnetic recording layer 113 by applying the high-frequency magnetic field to the magnetic recording layer 113 of the disk 10. When spin precession is largely generated in the spin torque oscillator 200, the permeability of the spin torque oscillator 200 is as low as that of air. Therefore, the magnetic flux from the main magnetic pole 171 is more likely to flow toward the disk 10 than toward the write gap (i.e., the spin torque oscillator 200). On the other hand, when the spin precession is not generated in the spin torque oscillator 200 or occurs less than normal, the permeability of spin torque oscillator 200 is higher than the permeability of air. Therefore, the magnetic flux from the main magnetic pole 171 is more likely to flow toward the write gap (i.e., the spin torque oscillator 200) than toward the disk 10. Hereinafter, a write process of writing data by applying a driving voltage or a driving current to the spin torque oscillator 200 may be referred to as assisted recording or high-frequency assisted recording. Hereinafter, the voltage or the current applied to the spin torque oscillator 200 may be referred to as an assist voltage or an assist current. Also, an effect of assisting the write process to the disk 10 may be referred to as an assist effect.

Figure 3A:
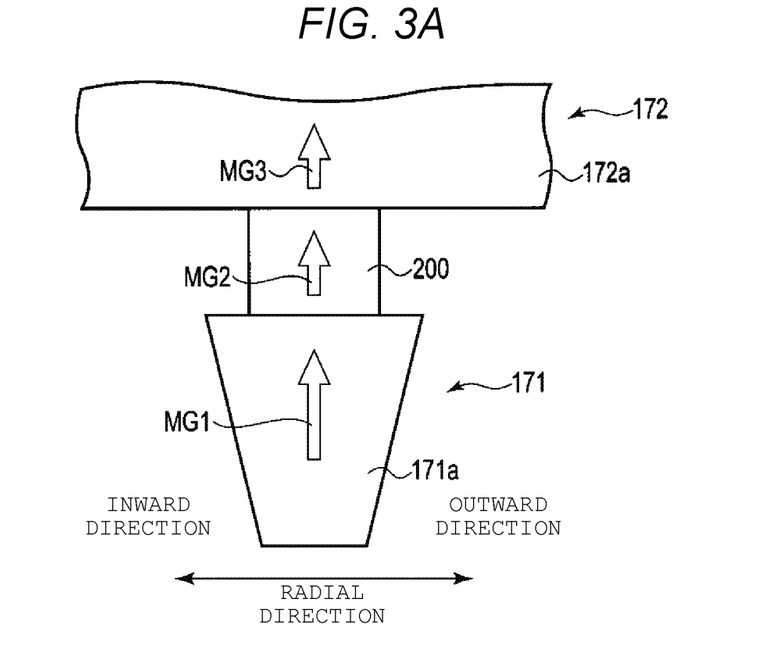
FIG. 3A is a view schematically illustrating a configuration example of a lower surface of the head observed from a disk-facing surface.

FIG. 3A is a view schematically illustrating a configuration example of a lower surface of the head 15 observed from the disk-facing surface 151. FIG. 3A illustrates a magnetization direction MG1 of the tip end portion 171a of the main magnetic pole 171, a magnetization direction MG2 of the spin torque oscillator 200, and a magnetization direction MG3 of the tip end portion 172a of the write shield 172.

In the example illustrated in FIG. 3A, when the spin torque oscillator 200 is not energized, that is, when the assist voltage (or the assist current) is not applied to the spin torque oscillator 200 or when, for example, a minute assist voltage (or the assist current) smaller than the driving voltage (or the driving current) is applied, the magnetization direction MG1 of the tip end portion 171a, the magnetization direction MG2 of the spin torque oscillator 200, and the magnetization direction MG3 of the tip end portion 172a are the same. The magnetization direction MG2 of the spin torque oscillator 200 is directed from the tip end portion 171a to the tip end portion 172a. That is, a part of the recording magnetic field directed from the tip end portion 171a of the main magnetic pole 171 to the disk 10 is directed to the spin torque oscillator 200. When the assist voltage (or the assist current) is not applied to the spin torque oscillator 200 or, for example, a minute assist voltage (or the assist current) smaller than the driving voltage (or the driving current) is applied, the magnetization direction MG2 of the spin torque oscillator 200 may be in the direction crossing the magnetization direction MG1 of the tip end portion 171a or the magnetization direction MG3 of the tip end portion 172a, as long as the magnetization direction MG2 of the spin torque oscillator 200 is directed from the tip end portion 171a to the tip end portion 172a.

Figure 3B:
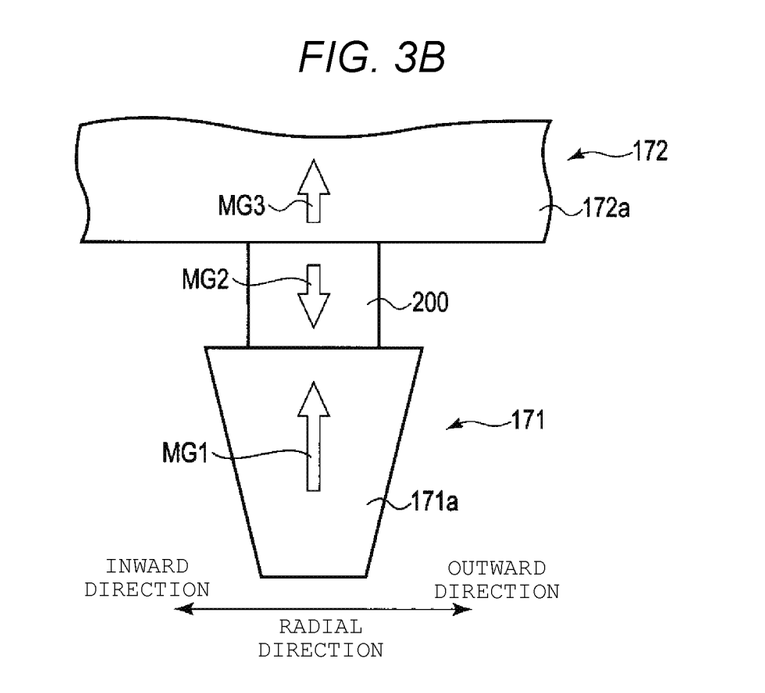
FIG. 3B is a view schematically illustrating a configuration example of the lower surface of the head observed from the disk-facing surface.

FIG. 3B is a view schematically illustrating a configuration example of the lower surface of the head 15 observed from the disk-facing surface 151.

In the example illustrated in FIG. 3B, when the spin torque oscillator 200 is energized, that is, when an assist voltage (or the assist current) higher than the driving voltage (or the driving current) is applied to the spin torque oscillator 200, the magnetization direction MG2 of the spin torque oscillator 200 is different from the magnetization direction MG1 of the tip end portion 171a and the magnetization direction MG3 of the tip end portion 172a. When an assist voltage (or the assist current) higher than the driving voltage (or the driving current) is applied to the spin torque oscillator 200, the magnetization direction MG1 of the tip end portion 171a and the magnetization direction MG3 of the tip end portion 172a are the same. The magnetization direction MG2 of the spin torque oscillator 200 is directed from the tip end portion 172a to the tip end portion 171a. In other words, the magnetization direction MG2 of the spin torque oscillator 200 is opposite to the magnetization direction MG1 of the tip end portion 171a and the magnetization direction MG3 of the tip end portion 172a. That is, the recording magnetic field directed from the tip end portion 171a of the main magnetic pole 171 to the spin torque oscillator 200 is directed to the disk 10 through the tip end portion 171a of the main magnetic pole 171. Further, when an assist voltage (or the assist current) higher than the driving voltage (or the driving current) is applied to the spin torque oscillator 200, the magnetization direction MG2 of the spin torque oscillator 200 may be in the direction crossing the magnetization direction MG1 of the tip end portion 171a or the magnetization direction MG3 of the tip end portion 172a, as long as the magnetization direction MG2 of the spin torque oscillator 200 is directed from the tip end portion 172a to the tip end portion 171a. When the assist voltage (or the assist current) is applied to the spin torque oscillator 200, if the magnetization direction MG1 of the tip end portion 171a and the magnetization direction MG3 of the tip end portion 172a are opposite to the magnetization direction MG2 of the spin torque oscillator 200, those magnetization directions may be in the direction crossing the magnetization direction MG2 of the spin torque oscillator 200.

The driver IC 20 drives the SPM 12 and the VCM 14 according to the control of the system controller 130 (e.g., an MPU 60 described later).

The head amplifier IC (or preamplifier) 30 includes a read amplifier (not illustrated), a write driver, for example, a recording current control circuit 310, an STO voltage control circuit 320, and the like. The read amplifier amplifies a read signal read from the disk 10 and outputs the amplified signal to a system controller 130 (more specifically, a read/write (R/W) channel 50 described below). The recording current control circuit 310 is electrically connected to the recording coil 180 and supplies the recording current according to the write data output from the R/W channel 50 to the recording coil 180. For example, the recording current control circuit 310 supplies the recording current to the recording coil 180 in accordance with the control of the system controller 130. The STO voltage control circuit (or the STO current control circuit) 320 is electrically connected to the spin torque oscillator 200 and applies a predetermined assist voltage or a predetermined assist current to the spin torque oscillator 200 according to the control of the system controller 130.

The volatile memory 70 is a semiconductor memory in which stored data is erased when power supply is cut off. The volatile memory 70 stores data or the like necessary for processing in each part of the magnetic disk device 1. The volatile memory 70 is, for example, a Dynamic Random Access Memory (DRAM) or a Synchronous Dynamic Random Access Memory (SDRAM).

The non-volatile memory 80 is a semiconductor memory in which the stored data is recorded even when the power supply is cut off. The non-volatile memory 80 is, for example, a NOR type or NAND type Flash Read Only Memory (FROM).

The buffer memory 90 is a semiconductor memory which temporarily records data or the like transmitted and received between the magnetic disk device 1 and the host 100. Further, the volatile memory 70 may also operate as the buffer memory 90. The buffer memory 90 is, for example, a DRAM, a Static Random Access Memory (SRAM), an SDRAM, a Ferroelectric Random Access Memory (Fe-RAM), or a Magnetoresistive Random Access Memory (MRAM).

The system controller 130 is, for example, a large scale integrated circuit (LSI) called a system-on-a-chip (SoC) in which a plurality of elements are integrated on a single chip. The system controller 130 includes a hard disk controller (HDC) 40, the read/write (R/W) channel 50, and the microprocessor (MPU) 60. The HDC 40, the R/W channel 50, and the MPU 60 are electrically connected to one another. The system controller 130 is electrically connected to, for example, the driver IC 20, the head amplifier IC 60, the volatile memory 70, the non-volatile memory 80, the buffer memory 90, the host system 100, and the like.

The HDC 40 controls data transfer between the host 100 and the R/W channel 50 in accordance with an instruction from the MPU 60 described below. The HDC 40 is electrically connected to, for example, the volatile memory 70, the non-volatile memory 80, and the buffer memory 90.

The R/W channel 50 performs signal processing of the read data and the write data in accordance with an instruction from the MPU 60. The R/W channel 50 is electrically connected to, for example, the head amplifier IC 30 or the like. The R/W channel 50 has a circuit or a function that modulates the write data. Also, the R/W channel 50 has a circuit or a function that measures the signal quality of the read data.

The MPU 60 is a main controller which controls each component of the magnetic disk device 1. The MPU 60 controls the VCM 14 via the driver IC 20 to execute positioning of the head 15. The MPU 60 controls the write operation of the data to the disk 10 and selects the storage destination of the write data transferred from the host 100. The MPU 60 also controls the read operation of the data from the disk 10 and controls the processing of the read data transferred from the disk 10 to the host 100. The MPU 60 is connected to each part of the magnetic disk device 1. The MPU 60 is electrically connected to, for example, the driver IC 20, the HDC 40, and the R/W channel 50.

The MPU 60 includes a resistance detection unit 610, a current/voltage control unit 620, and a read/write control unit 630. The MPU 60 executes firmware to achieve the function of each unit, for example, the resistance detection unit 610, the current/voltage control unit 620, the read/write control unit 630, and the like. Further, the MPU 60 may include dedicated circuits to perform the functions of each unit, for example, a resistance detection unit 610, a current/voltage control unit 620, a read/write control unit 630, and the like.

The resistance detection unit 610 detects a resistance value through the head amplifier IC 30. For example, the resistance detection unit 610 detects a resistance value of the spin torque oscillator 200 via the head amplifier IC 30 in order to check whether voltage or current is applied normally (or as usual) to the spin torque oscillator 200, or voltage or current is not applied normally. The resistance detection unit 610 determines whether the ratio (=current resistance value/normal resistance value) of the currently detected resistance value (hereinafter, sometimes referred to as the current resistance value) to the resistance value when the voltage or current is normally (or as usual) applied to the spin torque oscillator 200 (hereinafter, sometimes also referred to as the normal resistance value) exceeds or is below a threshold value. Hereinafter, "the ratio of the current resistance value to the normal resistance value" will be referred to as a "resistance change rate". When it is determined that the resistance change rate exceeds the threshold value, the resistance detection unit 610 controls the current and voltage through the current/voltage control unit 620 and changes the recording method through the read/write control unit 630 because the spin torque oscillator 200 may be damaged. For example, when it is determined that the resistance change rate exceeds the threshold value, the resistance detection unit 610 outputs signals (hereinafter, sometimes also referred to as changed signals) to the current/voltage control unit 620 and the read/write control unit 630, respectively. In this case, the threshold value is a change rate of a few percent, and in an example, a change rate of 3 to 5 percent. For example, when the resistance change rate changes by a few (positive value) percent, a part of the substance constituting the spin torque oscillator 200 may precipitate and adhere to the disk-facing surface 151 as contamination. Even when the resistance change rate changes by a few percent, by further energizing, the spin torque oscillator 200 may be damaged or the resistance change rate may change by a few percent, which results in adhesion of the contamination onto the disk-facing surface 151. Therefore, the assist effect by spin torque oscillator 200 is reduced, and thus, the recording density may be reduced or the surface of the disk 10 may be damaged.

The current/voltage control unit 620 controls the current and voltage, for example, the recording current and the assist voltage (or the assist current). When the changed signal is received from the resistance detection unit 610, the current/voltage control unit 620 changes the assist voltage or the assist current via the head amplifier IC 30. For example, when the changed signal is received from the resistance detection unit 610, the current/voltage control unit 620 reduces or turns off the assist voltage or the assist current (for example, by adjusting it to zero) via the head amplifier IC 30. In other words, when the changed signal is received from the resistance detection unit 610, the current/voltage control unit 620 reduces or turns off the assist voltage or the assist current so that a part of the spin torque oscillator 200 is not precipitated by applying a high current or voltage to the spin torque oscillator 200. For example, when the changed signal is received from the resistance detection unit 610, the current/voltage control unit 620 reduces or turns off the assist voltage or the assist current to the voltage smaller than the driving voltage or the current smaller than the driving current. For example, when the assist voltage or the assist current is reduced to the voltage smaller than the driving voltage or the current smaller than the driving current, the magnetization direction of the spin torque oscillator 200 is directed from the tip end portion 171*a* of the main magnetic pole 171 toward the tip end portion 172*a* of the write shield 172 as illustrated in FIG. 3A. The current/voltage control unit 620 may adjust the recording current applied to the recording coil 180 via the head amplifier IC 30 when receiving the changed signal from the resistance detection unit 610. For example, the current/voltage control unit 620 may increase the recording current applied to the recording coil 180 via the head amplifier IC 30 when receiving the changed signal from the resistance detection unit 610.

The read/write control unit 630 controls data read processing and data write processing according to a command from the host 100. The read/write control unit 630 controls the VCM 14 via the driver IC 20, positions the head 15 at a predetermined radial position on the disk 10, and executes read processing or write processing. For example, the read/write control unit 630 executes a write process in a Conventional Magnetic Recording (CMR) method in which other tracks are written at predetermined intervals from tracks adjacent in the radial direction (hereinafter referred to as adjacent tracks) by assisted recording. "Writing in the conventional magnetic recording method by assisted recording" may be referred to simply as "assisted recording". The read/write control unit 630 executes a write process in a shingled write magnetic recording (SMR) or shingled write recording (SWR) method in which the next track is overwritten to a part of the adjacent track. The term "writing in the shingled write recording method" is referred to as "shingled write recording". Further, the read/write control unit 630 may execute a write process in the shingled write recording method by assisted recording. The term "writing in the shingled write recording method by assisted recording" may be referred to as "assisted (high-frequency assisted)/shingled write recording".

The read/write control unit 630 changes the recording methods according to the resistance value. For example, when it is determined that the resistance change rate is equal to or less than the threshold value, the read/write control unit 630 performs assisted recording of the data on the disk 10. In other words, when it is determined that the resistance change rate is equal to or less than the threshold value, the read/write control unit 630 uses the spin torque oscillator 200 to perform assisted recording of data on the disk 10 by using the conventional magnetic recording method. "Using the spin torque oscillator 200" may be used to mean "applying, for example, a driving voltage or a driving current to the spin torque oscillator 200 to produce an assist effect". In addition, "the spin torque oscillator 200 is not used" may be used to mean "applying an assist voltage or current smaller than the driving voltage or driving current to the spin torque oscillator 200 to produce almost no assist effect" or "applying no voltage or current to the spin torque oscillator 200 to produce no assist effect". When it is determined that the resistance change rate is larger than the threshold value, the read/write control unit 630 changes the recording methods from the conventional magnetic recording method to the shingled write recording method and performs shingled write recording of the data on the disk 10. In other words, when a changed signal is received from the resistance detection unit 610, the read/write control unit 630 changes the recording methods from the conventional magnetic recording method to the shingled write recording method and performs shingled write recording of the data on the disk 10 without using the spin torque oscillator 200. Also, when it is determined that the resistance change rate is equal to or less than the threshold value, the read/write control unit 630 may perform assisted recording or shingled write recording of the data on the disk 10.

Figure 4A:
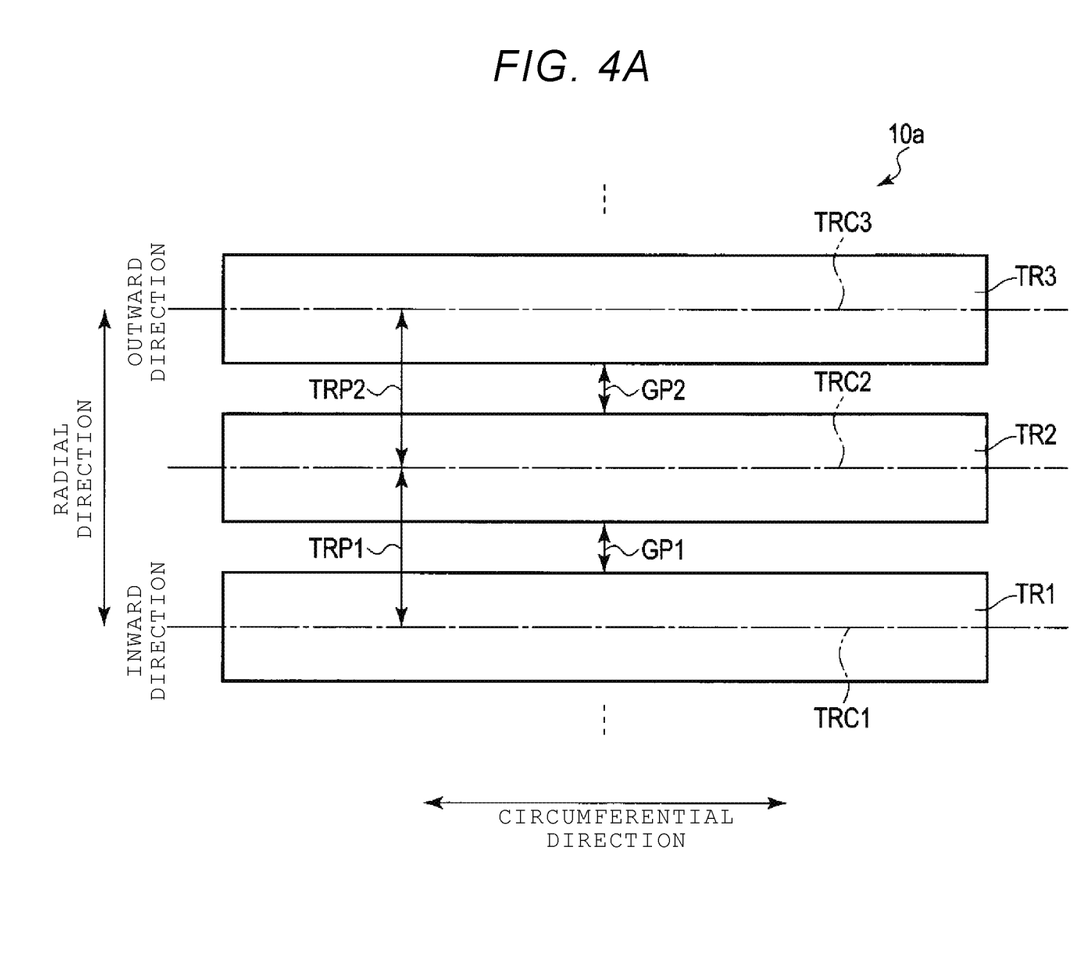
FIG. 4A is a schematic view illustrating an example of a write process of a normal recording method.

FIG. 4A is a schematic view illustrating an example of a write process of the conventional magnetic recording method. Tracks TR1, TR2, and TR3 are illustrated in FIG. 4A. FIG. 4A illustrates a track center TRC1 of the track TR1, a track center TRC2 of the track TR2, and a track center TRC3 of the track TR2. In the conventional magnetic recording method, a track pitch TRP1 of the track TR1 and the track TR2 corresponds to a distance between the track centers TRC1 and TRC2 and a track pitch TRP2 of the track TR2 and the track TR3 corresponds to a distance between the track centers TRC2 and TRC3. The track TR1 and the track TR2 are separated by a gap GP1. The track TR2 and the track TR3 are separated by a gap GP2.

In the example illustrated in FIG. 4A, the read/write control unit 630 writes the track TR1 when executing a write process of the conventional magnetic recording method. The read/write control unit 630 is positioned at the track pitch TRP1 outward from the track TR1 and writes the track TR2. The read/write control unit 630 is positioned at the track pitch TRP2 outward from the track TR2 and writes the track TR3.

Figure 4B:
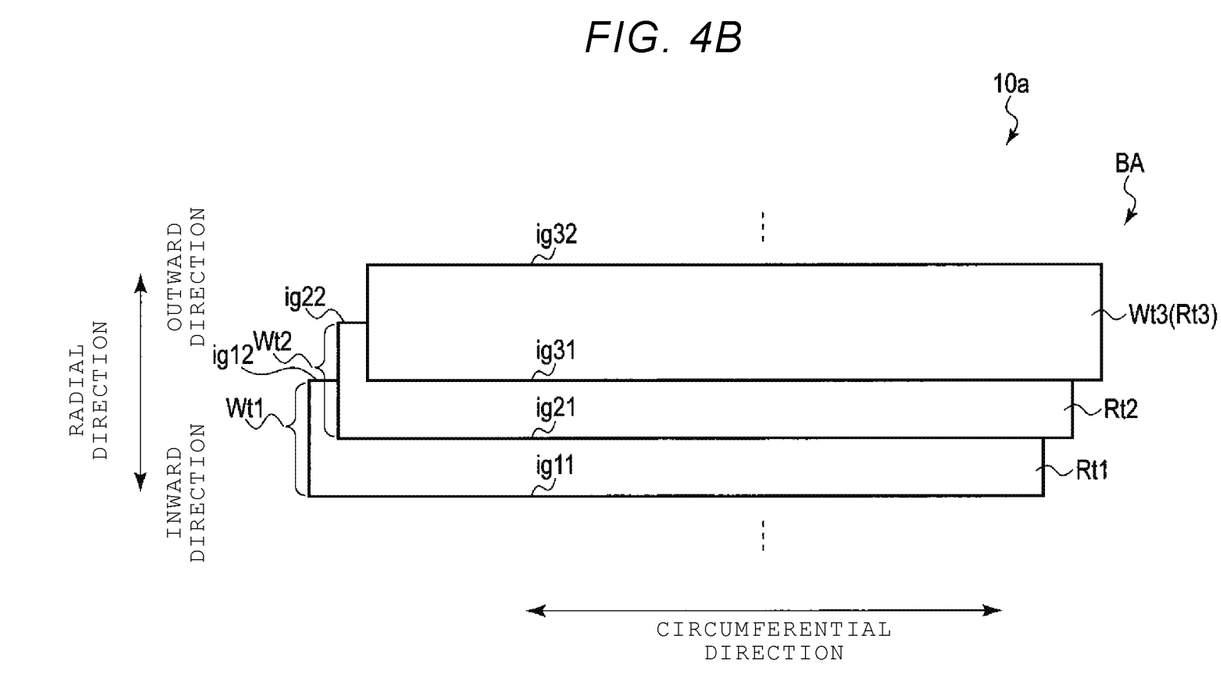
FIG. 4B is a schematic view illustrating an example of a write process of a shingled write recording method.

FIG. 4B is a schematic diagram illustrating an example of a write process of the shingled write recording method. FIG. 4B illustrates a band area BA including a plurality of tracks (or track groups or bands) continuously overwritten in one direction in the radial direction. In the shingled write recording method, the written track is referred to as a write track, and a portion of the remaining write track excluding the area where the adjacent track is overwritten is referred to as a read track. In FIG. 4B, for the convenience of illustration, each track is shown by a straight line extending along the circumferential direction with a certain track width. However, actually, each track may be a curve along the circumferential direction and may be radially displaced with respect to the circumferential direction.

FIG. 4B illustrates write tracks Wt1, Wt2, and Wt3. The write track Wt1 has a track edge ig11 and a track edge ig12. In the illustrated example, the track edge ig11 is an inward end portion of the write track Wt1 and the track edge ig12 is an outward end portion of the light track Wt2. The write track Wt2 has a track edge ig21 and a track edge ig22. In the illustrated example, the track edge ig21 is an inward end portion of the write track Wt1 and the track edge ig22 is an outward end portion of the write track Wt2. The write track Wt3 has a track edge ig31 and a track edge ig32. In the illustrated example, the track edge ig31 is an inward end portion of the write track Wt1 and the track edge ig32 is an outward end portion of the write track Wt2.

FIG. 4B illustrates a read track width Rtw11 which is a radial width from the track edge ig11 to the track edge ig21 and a read track width Rtw21 which is a radial width from the track edge ig21 to the track edge ig31. In the shingled write recording method, the read track width Rtw11 corresponds to the track pitch between the read track Rt1 and the read track Rt2 and the read track width Rtw21 corresponds to the track pitch between the read track Rt2 and the read track Rt3. Further, in FIG. 4B, while the band area BA described includes three tracks, the band area BA may include less than three tracks or more than three tracks.

In the example illustrated in FIG. 4B, when a write process of the shingled write recording method is executed, for example, when a changed signal is received from the resistance detection unit 610, in the band area BA, the read/write control unit 630 writes the write track Wt1, overwrites the write track Wt2 with the track pitch Rtw11 in the outward direction of write track Wt1, and overwrites the write track Wt3 with the track pitch Rtw21 in the outward direction of write track Wt2. Further, when writing a band area different from the band area BA in the radial direction of the band area BA, the read/write control unit 630 writes another band area with a predetermined gap from the band area BA in the radial direction.

For example, as illustrated in FIG. 4A, when the read/write control unit 630 performs the shingled write recording method because the resistance change rate exceeds the threshold value during assisted recording in the conventional magnetic recording method, at least one track assist-recorded in the conventional magnetic recording method shown in FIG. 4A and a band area including a plurality of tracks (or track group) overwritten by shingled write recording shown in FIG. 4B can be mixed in the user data area 10a.

Figure 5:
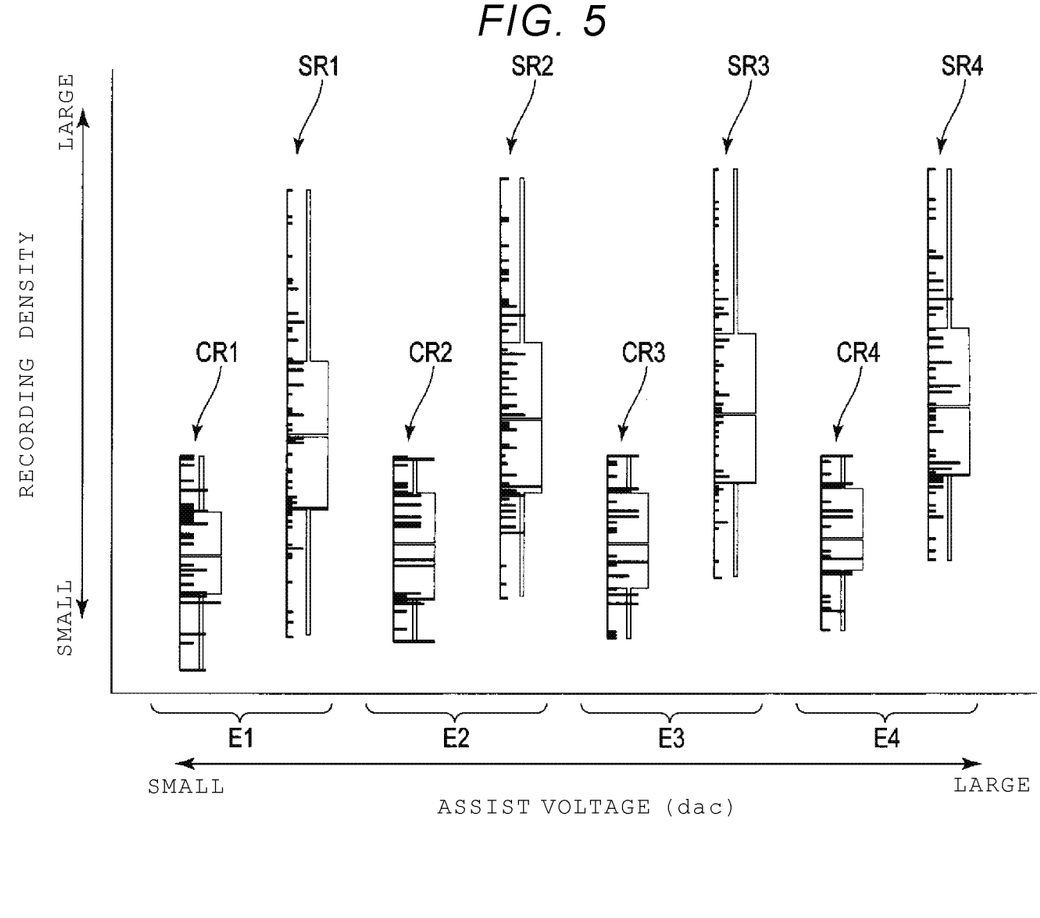
FIG. 5 is a view illustrating an example of recording density according to each recording method with respect to assist voltage.

FIG. 5 is a view illustrating an example of the recording density according to each recording method with respect to the assist voltage. In FIG. 5, a horizontal axis indicates an assist voltage "dac" and a vertical axis indicates a recording density. In the vertical axis of FIG. 5, the recording density increases in the direction of an arrow directed to large and decreases in the direction of an arrow directed to small. In the horizontal axis of FIG. 5, the assist voltage increases in the direction of an arrow directed to large and decreases in the direction of an arrow directed to small. In the horizontal axis of FIG. 5, assist voltages E1, E2, E3, and E4 are shown. The assist voltage E2 is larger than the assist voltage E1, the assist voltage E3 is larger than the assist voltage E2, and the assist voltage E4 is larger than the assist voltage E3. The assist voltage E1 corresponds to, for example, 0 (dac) and the assist voltage E4 corresponds to, for example, the driving voltage. FIG. 5 shows a recording density CR1 in a specified radius area where data is written by conventional magnetic recording by assisted recording where the assist voltage E1 is applied to the spin torque oscillator 200, and a recording density SR1 in a specified radius area where data is written by shingled write recording by assisted recording where the assist voltage E1 is applied to the spin torque oscillator 200. In FIG. 5, a recording density CR2 in a specified radius area where data is written by conventional magnetic recording by assisted recording where the assist voltage E2 is applied to the spin torque oscillator 200, and a recording density SR2 in a specified radius area where data is written by shingled write recording by assisted recording where the assist voltage E2 is applied to the spin torque oscillator 200. In FIG. 5, a recording density CR3 in a specified radius area where data is written by conventional magnetic recording by assisted recording where the assist voltage E3 is applied to the spin torque oscillator 200, and a recording density SR3 in a specified radius area where data is written by shingled write recording by assisted recording where the assist voltage E3 is applied to the spin torque oscillator 200. In FIG. 5, a recording density CR4 in a specified radius area where data is written by conventional magnetic recording by assisted recording where the assist voltage E4 is applied to the spin torque oscillator 200, and a recording density SR4 in a specified radius area where data is written by shingled write recording by assisted recording where the assist voltage E4 is applied to the spin torque oscillator 200.

As illustrated in FIG. 5, the recording density SR1 in the specified radial area where data is written by shingled write recording by assisted recording where the assist voltage E1 is applied to the spin torque oscillator 200 is larger than the recording density CR4 in the specified radial area where data is written by conventional magnetic recording by assisted recording where the assist voltage E4 is applied to the spin torque oscillator 200. Therefore, even when the assist voltage applied to the spin torque oscillator 200 is reduced or turned off (i.e., by making it zero), by changing the recording method from assisted recording to shingled write recording, it is possible to maintain the recording density corresponding to the recording density of the specified radial area assist-recorded by applying the assist voltage equal to or higher than the driving voltage or the assist current equal to or higher than the driving current to the spin torque oscillator 200. In other words, even when the torque oscillator 200 is not used, by changing the recording methods from assisted recording to shingled write recording, it is possible to maintain the recording density corresponding to the recording density in a specified radial area assist-recorded by applying a normal voltage or current to the spin torque oscillator 200.

Figure 6:
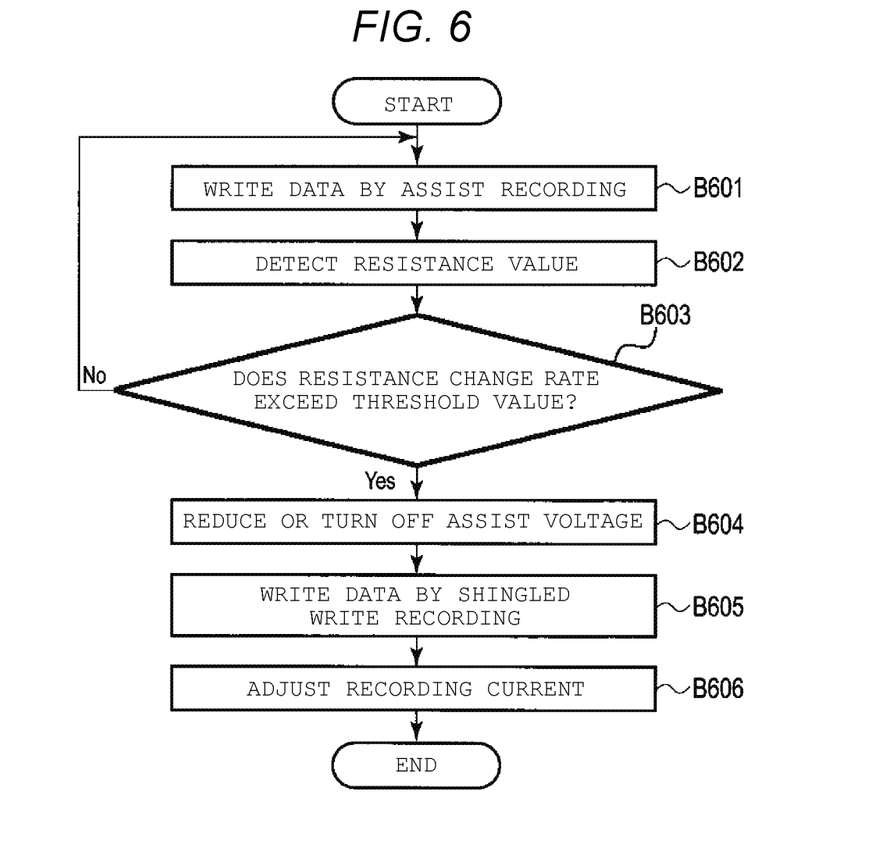
FIG. 6 is a flowchart illustrating a write process according to the first embodiment.

FIG. 6 is a flowchart illustrating the write process according to the first embodiment.

The MPU 60 writes data by assisted recording (B601) and detects a resistance value (B602). For example, the MPU 60 performs assisted recording (e.g., high-frequency assisted recording) of data on the disk 10 as a conventional magnetic recording method using the spin torque oscillator 200 and detects the resistance value. The MPU 60 determines whether the resistance change rate exceeds the threshold value or is equal to or less than the threshold value (B603). When it is determined that the resistance change rate is equal to or less than the threshold value (No in B603), the MPU 60 proceeds to the process of B601. For example, when it is determined that the resistance change rate is equal to or less than the threshold value, the MPU 60 continues the write process to perform the assisted recording (i.e., the high-frequency assisted recording as the conventional magnetic recording method) of data on the disk 10 using the spin torque oscillator 200. When it is determined that the resistance change rate exceeds the threshold value (Yes in B603), the MPU 60 reduces or turns off the assist voltage (or assist current) (B604). In other words, when it is determined that the resistance change rate exceeds the threshold value, the MPU 60 changes the assist voltage. The MPU 60 writes data by shingled write recording (B605), adjusts the recording current applied to the recording coil 180 (B606), and ends the process. For example, the MPU 60 writes data to the disk 10 in the shingled write recording type without using the spin torque oscillator 200 by reducing or turning off the assist voltage or the assist current.

According to the embodiment, the magnetic disk device 1 includes the main magnetic pole 171, the write shield facing the main magnetic pole 171 with the write gap interposed therebetween, the recording coil 180 which excites the recording magnetic field to the magnetic circuit including the main magnetic pole 171 and the write shield 172, and the spin torque oscillator 200 provided in the write gap. The magnetic disk device 1 writes data to the disk 10 by assisted recording using the spin torque oscillator 200 and detects the resistance value. When it is determined that the resistance change rate exceeds the threshold value, the magnetic disk device 1 reduces or turns off the assist voltage to a predetermined voltage, for example, the driving voltage or less. Therefore, the magnetic disk device 1 can reduce the risk of damage to the spin torque oscillator 200 or attachment of contamination to the disk-facing surface 151 and the surface of the disk 10. Further, when the assist voltage is reduced or turned off, the magnetic disk device 1 changes the recording methods from the conventional magnetic recording method to the shingled write recording method and writes data to the disk 10 by shingled write recording. Therefore, even when the assisted recording is not used, the magnetic disk device 1 can maintain the recording density. Thus, the magnetic disk device can improve reliability.

Next, a magnetic disk device according to another embodiment will be described. In the other embodiment, the same reference signs are given to the same parts as those of the embodiment described above and the detailed descriptions thereof will be omitted.

Second Embodiment

The magnetic disk device 1 of the second embodiment is different from the magnetic disk device 1 of the first embodiment in that data can be written in Thermally Assisted Magnetic Recording (TAMR).

Figure 7:
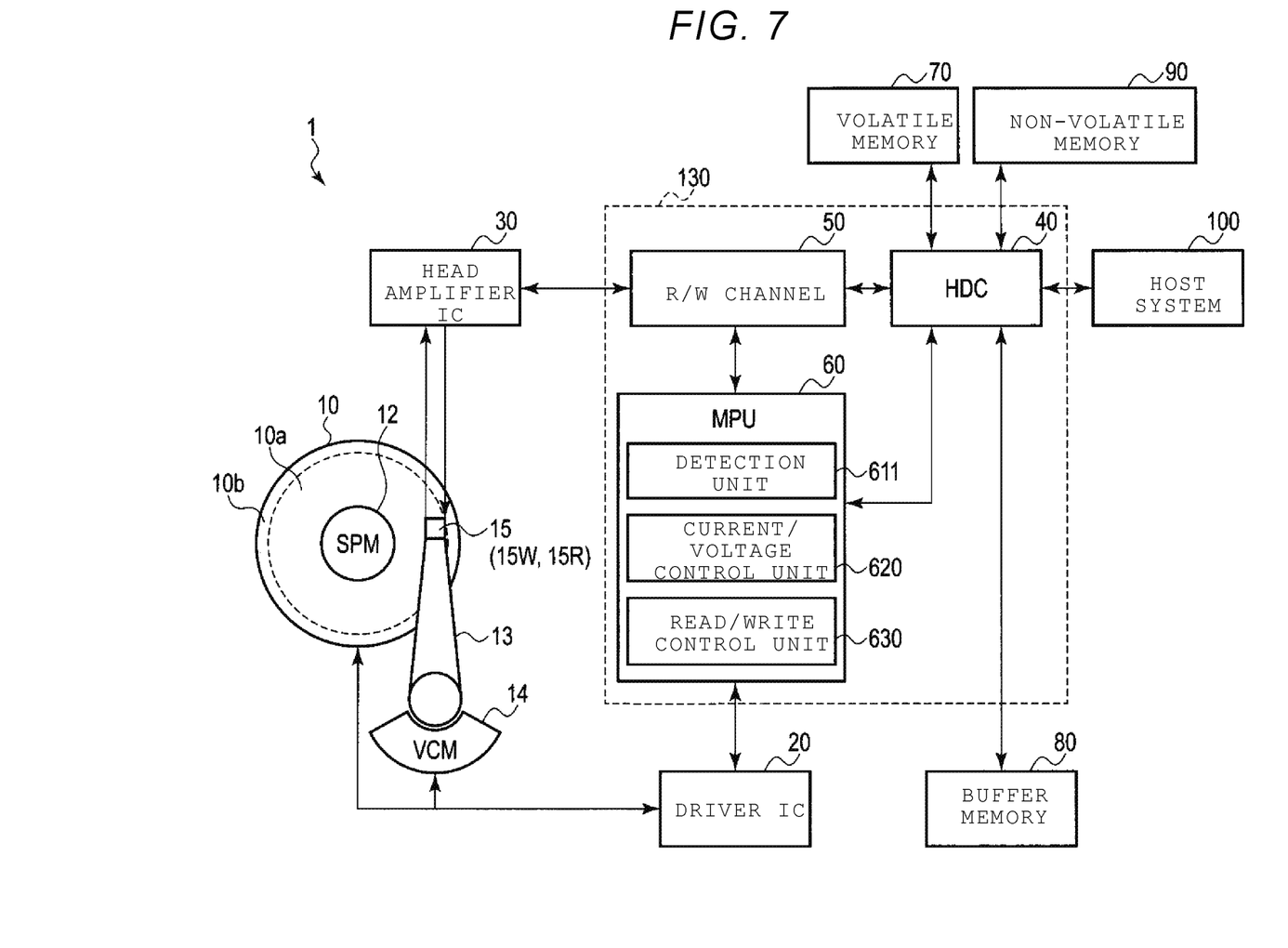
FIG. 7 is a block diagram illustrating a configuration of a magnetic disk device according to a second embodiment.
Figure 8:
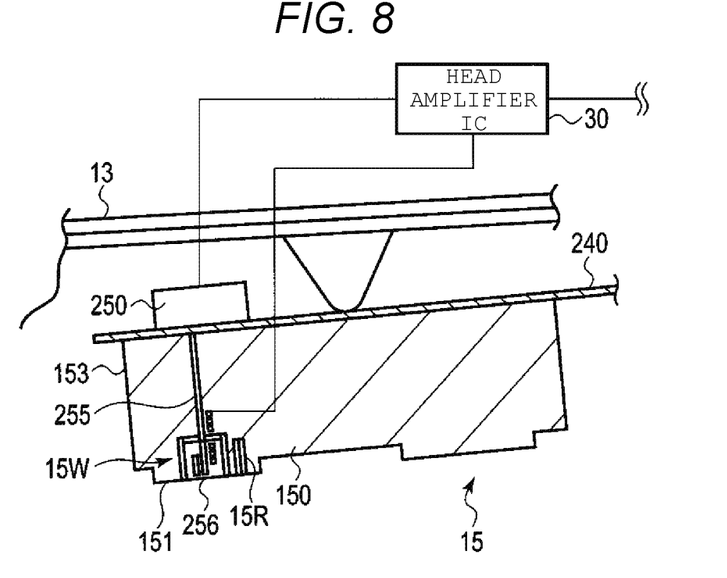
FIG. 8 is an enlarged cross-sectional view illustrating a head according to the second embodiment.

FIG. 7 is a block diagram illustrating a configuration of the magnetic disk device 1 according to the second embodiment and FIG. 8 is an enlarged cross-sectional view illustrating the head 15 according to the present embodiment.

The magnetic disk device 1 has the system controller 130 including a detection unit 611.

In an example illustrated in FIG. 8, the head 15 includes the write head 15W and the read head 15R on the slider 150, a light generating element (e.g., a laser diode) 250, a waveguide 255, and a near-field light emitting element (e.g., a plasmon generator or near-field transducer) 256.

The light generating element 250 is a light source provided on an upper portion of the slider 150 or on a gimbal. The light generating element 250 supplies light rays to the waveguide 255 by receiving a current or voltage from the head amplifier IC 30. The light generating element 250 may be provided at a location other than the slider 150 or the gimbal. For example, the light generating element 250 may be provided outside the arm 13 and the head 15. The waveguide 255 propagates the light rays generated by the light generating element 250 to the near-field light emitting element 256.

The near-field light emitting element 256 is provided at a lower end portion of the slider 150 facing the disk 10. When data is written to the disk 10, the near-field light emitting element 256 generates near-field light rays from the laser light rays propagated through the waveguide 255 and irradiates the disk 10 with near-field light rays. The emitted near-field light rays heat the recording layer of the disk 10 and reduce the coercivity of the recording layer of the disk 10. The near-field light emitting element 256 includes a metal member. Instead of the near-field light emitting element 256, a lens which collects the light rays propagating from the light generating element 250 onto the disk 10 may be provided. As described above, by irradiating the disk 10 with the near-field light rays generated from the near-field light emitting element 256, the magnetic disk device 1 can perform high-density magnetic recording on the disk 10 which is a high coercivity medium. Hereinafter, a write process of writing data by supplying a predetermined voltage or a predetermined current to the light generating element 250 may be referred to as assisted recording or thermally assisted recording. Further, a configuration for performing thermally assisted recording, for example, the light generating element (e.g., a laser diode) 250, the waveguide 255, the near-field light emitting element (e.g., a plasmon generator or a near-field transducer) 256, or the like may be referred to as an assist element.

Also, the near-field light emitting element 256 defines a track width (or recording width) to be written by the write head 15W depending on a near-field light irradiation range (or may be referred to as a spot range or a heat distribution range). That is, the track width corresponds to the width of the near-field light irradiation range. For example, when the near-field light emitting element 256 irradiates the near-field light irradiation range with light rays of a width smaller than the width of the write head 15W, the track width of the track written by the write head 15W can be smaller than the width of the write head 15W. Also, the near-field light emitting element 256 irradiates the near-field light irradiation range with the light rays of a width larger than the width of the write head 15W, the track width of the track written by the write head 15W can be larger than the width of the write head 15W. Therefore, when the shape of the near-field light emitting element changes due to factors such as heat generated when emitting near-field light rays, the near-field light irradiation range fluctuates and the track width of the track written by the write head 15W changes accordingly. For example, when the current or voltage supplied to the light generating element 250 is increased beyond a normal current (hereinafter, may be referred to as a specified current) or a normal voltage (hereinafter, may be referred to as a specified voltage), the intensity of the near-field light rays emitted from the near-field light emitting element 256 is increased, thereby improving the thermal assist effect. However, the irradiation range is also expanded and the track width can be increased.

The head amplifier IC30 is electrically connected to the light generating element 250 and applies a current or voltage to the light generating element 250 in accordance with the control of the system controller 130, for example, the MPU 60.

The MPU 60 includes the detection unit 611. The MPU 60 executes firmware to achieve the function of the detection unit 611. The MPU 60 may be a dedicated circuit to execute the function of the detection unit 611.

The detection unit 611 detects the recording quality of the data written to the disk 10 via the head 15. The detection unit 611 reads the data written to the disk 10 via the head 15, and detects the recording quality of the data by an error rate, for example, a bit error rate (BER) or the over write. For example, the detection unit 611 determines whether the error rate exceeds or is equal to or less than the threshold value. When it is determined that the error rate exceeds the threshold value, since the recording quality of the data may be degraded, the detection unit 611 controls the current through the current/voltage control unit 620 and changes the recording methods via the read/write control unit 630. For example, when it is determined that the error rate exceeds the threshold value, the resistance detection unit 610 outputs changed signals to the current/voltage control unit 620 and the read/write control unit 630.

For example, when the current/voltage control unit 620 receives the changed signal from the detection unit 611, the current/voltage control unit 620 increases the current or voltage applied to the light generating element 250 via the head amplifier IC 30 to be more than the specified current or specified voltage. In other words, when the current/voltage control unit 620 receives the changed signal from the detection unit 611, the current/voltage control unit 620 changes the current or voltage applied to the light generating element 250 via the head amplifier IC30. The current/ voltage control unit 620 may adjust the recording current applied to the recording coil 180 via the head amplifier IC 30 when receiving the changed signal from the detection unit 611. For example, the current/voltage control unit 620 may increase the recording current applied to the recording coil 180 via the head amplifier IC 30 when receiving the changed signal from the detection unit 611.

For example, when the read/write control unit 630 determines that the error rate is equal to or less than the threshold value, the read/write control unit 630 performs assisted recording (e.g., thermally-assisted recording) of data on the disk 10. When the read/write control unit 630 determines that the error rate is larger than the threshold value, the read/write control unit 630 performs shingled write recording of data on the disk 10. In other words, when the read/write control unit 630 receives the changed signal from the detection unit 611, the recording method is changed from the conventional magnetic recording method by assisted recording (e.g., thermally assisted recording) to the shingled write recording method. Further, the read/write control unit 630 may perform assisted (e.g., thermally assisted)/shingled write recording of data on the disk 10 when it is determined that the error rate is equal to or less than the threshold value.

Figure 9:
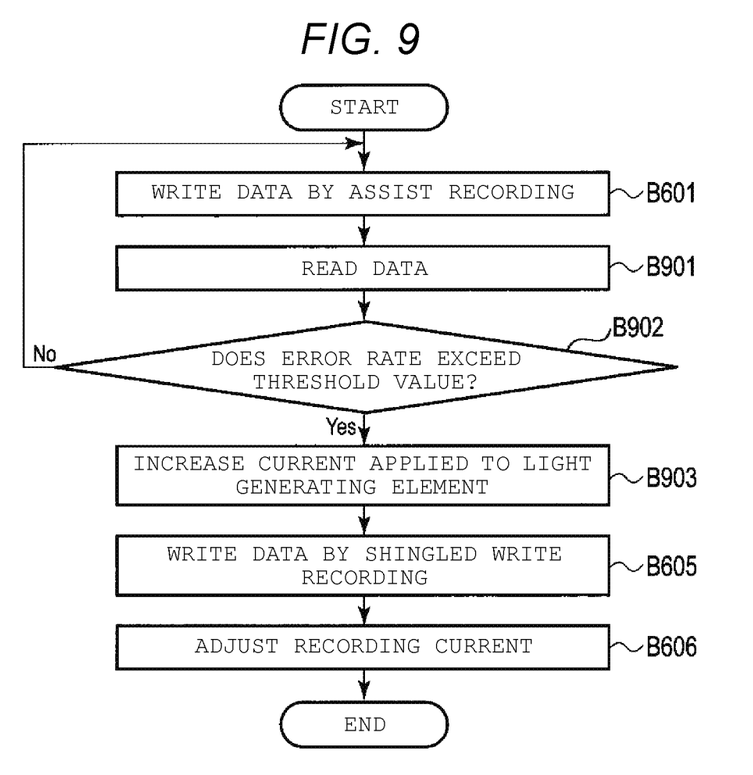
FIG. 9 is a flowchart illustrating a write process according to the second embodiment.

FIG. 9 is a flowchart illustrating the write process according to the second embodiment.

The MPU 60 writes data by assisted recording (e.g., thermally assisted recording) (B601), and reads the data written to the disk 10 to detect the recording quality of the data (B901). For example, the MPU 60 applies a specified current (or specified voltage) to the light generating element 250, performs the assisted recording (e.g., the thermally assisted recording as the conventional magnetic recording) of data on the disk, reads data written to the disk 10, and detects the error rate. The MPU 60 determines whether the error rate exceeds the threshold value or is equal to or less than the threshold value (B902). When it is determined that the error rate is equal to or less than the threshold value (No in B902), the MPU 60 proceeds to the process of B601. For example, when the MPU 60 determines that the error rate is equal to or less than the threshold value, the MPU 60 applies a specified current (or specified voltage) to the light generating element 250 and continues the write process of performing the assisted recording (i.e., the thermally assisted recording as the conventional magnetic recording) on the disk 10. When it is determined that the error rate exceeds the threshold value (Yes in B902), the MPU 60 increases the current applied to the light generating element 250 (B903). In other words, when it is determined that the error rate is equal to or less than the threshold value, the MPU 60 changes the current applied to the light generating element 250. The MPU 60 writes data by shingled write recording (B605), adjusts the recording current applied to the recording coil 180 (B606), and ends the process. For example, the MPU 60 increases the thermal assist effect by increasing the voltage or current applied to the light generating element 250 and writes data to the disk 10 in the shingled write recording method in the state of expanding the track width.

The magnetic disk device 1 writes data by thermally assisted recording and detects the recording quality of the data. When it is determined that the error rate exceeds the threshold value, the magnetic disk device 1 increases the current or voltage applied to the light generating element 250 to be more than the specified current or the specified voltage. By increasing the current or voltage applied to the light generating element 250 beyond the specified current or the specified voltage, the thermal assist effect is increased and the track width is expanded. When the current or voltage applied to the light generating element 250 is increased beyond the specified current or the specified voltage, the magnetic disk device 1 changes the recording methods from the conventional magnetic recording method to the shingled write recording method and writes the data by shingled write recording method. Therefore, the thermal assist effect enables writing to the disk 10 which is a high coercivity medium, and the reduction in the recording density due to the expanded track width can be prevented. Therefore, even when the magnetic disk device 1 increases the supplied voltage or current in order to prevent the reduction in the thermal assist effect due to the deterioration of the light generating element 250, the waveguide 255, and the near-field light emitting element 256, or the like, and increases the output of the light generating element 250, and thus, the track width is expanded, the recording density can be maintained by shingled write recording. As a result, the magnetic disk device can improve reliability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
 a disk;
 a head comprising a main magnetic pole and a write shield, and configured to generate a magnetic field from the main magnetic pole to the write shield to write data onto the disk;
 an assist element configured to assist the writing by generating a magnetic field; and
 a controller configured to:
  detect a resistance value of the assist element and determine a condition thereof; and
  control the head to write the data according to either a first recording method using the assist element or a second recording method not using the assist element depending on the condition of the assist element.

2. The magnetic disk device according to claim 1, wherein in the second recording method the head writes the data onto the disk such that adjacent tracks on the disk are partially overlapped.

3. The magnetic disk device according to claim 1, wherein in the first recording method the head writes the data onto the disk such that adjacent tracks on the disk are not overlapped.

4. The magnetic disk device according to claim 1, wherein when a variation of the detected resistance value exceeds a threshold, the controller controls the head to write the data according to the second recording method instead of the first recording method.

5. The magnetic disk device according to claim 1, wherein the assist element is arranged between the main magnetic pole and the write shield.

6. The magnetic disk device according to claim 5, wherein the assist element is a spin torque oscillator configured to generate the magnetic field in a direction opposite to a direction of the magnetic field from the main magnetic pole to the write shield.

7. The magnetic disk device according to claim 1, wherein
in the first recording method, the controller activates the assist element by applying a first voltage to the assist element.

8. A magnetic disk device comprising:
a disk;
a head comprising a main magnetic pole and a write shield, and configured to generate a magnetic field from the main magnetic pole to the write shield to write data onto the disk;
an assist element configured to assist the writing by generating a magnetic field; and
a controller configured to control the head to write the data according to either a first recording method using the assist element or a second recording method not using the assist element depending on a condition of the assist element, wherein
in the first recording method, the controller activates the assist element by applying a first voltage to the assist element, and
in the second recording method, the controller deactivates the assist element by cutting off the first voltage to the assist element.

9. A method of writing data onto a magnetic disk drive that has a head including a main magnetic pole and a write shield and an assist element, the method comprising:
writing, by the head, data onto the disk according to a first recording method using the assist element, wherein the assist element assists the writing by generating a magnetic field or heating a surface of the disk;
monitoring a condition of the assist element; and
once a predetermined condition is met, writing by the head the data according to a second recording method not using the assist element.

10. The method according to claim 9, wherein
in the second recording method, the data is written onto the disk such that adjacent tracks on the disk are partially overlapped.

11. The method according to claim 9, wherein
in the first recording method, the data is written onto the disk such that adjacent tracks on the disk are not overlapped.

12. The method according to claim 9, wherein
the monitoring comprises detecting a resistance value of the assist element.

13. The method according to claim 12, wherein
the predetermined condition is met when a variation of the detected resistance value exceeds a threshold.

14. The method according to claim 9, wherein
the assist element is arranged between the main magnetic pole and the write shield.

15. The method according to claim 14, wherein
in the first recording method, the magnetic field generated by the assist element is generated in a direction opposite to a direction of a magnetic field generated by the main magnetic pole towards the write shield.

16. The method according to claim 14, further comprising:
in the first recording method, activating the assist element by applying a first voltage to the assist element.

17. The method according to claim 9, further comprising:
in the second recording method, deactivating the assist element by cutting off the first voltage to the assist element.

18. The method according to claim 9, wherein
the surface of the disk is heated by a laser emitted from the assist element.

* * * * *